United States Patent
Lisewski et al.

(10) Patent No.: US 11,310,632 B2
(45) Date of Patent: *Apr. 19, 2022

(54) AUTOMATICALLY CONNECTING TO A MULTICAST PRIORITY SERVICE WITH REDUCED LATENCY

(71) Applicant: Verizon Patent and Licensing Inc., Basking Ridge, NJ (US)

(72) Inventors: Kevin Lisewski, Ramsey, NJ (US); Arvind Basra, Glen Ridge, NJ (US); Mansoor Ali Shah Mohammed, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 46 days.

This patent is subject to a terminal disclaimer.

(21) Appl. No.: 16/899,648

(22) Filed: Jun. 12, 2020

(65) Prior Publication Data
US 2020/0304959 A1 Sep. 24, 2020

Related U.S. Application Data

(63) Continuation of application No. 16/113,750, filed on Aug. 27, 2018, now Pat. No. 10,701,526.

(51) Int. Cl.
*H04W 4/06* (2009.01)
*H04W 48/10* (2009.01)
(Continued)

(52) U.S. Cl.
CPC .............. *H04W 4/06* (2013.01); *H04W 48/10* (2013.01); *H04W 48/16* (2013.01);
(Continued)

(58) Field of Classification Search
CPC ... H04W 4/06; H04W 48/10; H04W 74/0875; H04W 48/16; H04W 28/0215; H04W 84/005; H04W 28/0252; H04W 88/184; H04W 88/02; H04W 4/46; H04W 4/02; H04W 4/027; H04L 67/16; H04L 67/12; H04L 47/15
See application file for complete search history.

(56) References Cited

U.S. PATENT DOCUMENTS

9,155,069 B2 10/2015 Kim et al.
9,467,973 B2 10/2016 Kim et al.
(Continued)

*Primary Examiner* — Brian T O Connor (57) ABSTRACT

A device connects to a standard channel of a multicast network based on entering a service area, and receives a service announcement (SA) file via the standard channel. The device parses the SA file to determine a list of services identified in the SA file, and receives a selection of a priority service from the list of services. The device updates a priority counter associated with the priority service based on the selection. The device receives, after the period of time, information indicating entry into the service area, and determines that the priority counter satisfies a threshold based on receiving the information indicating entry into the service area. The device automatically connects to a priority channel of the multicast network, associated with the priority service, based on the priority counter satisfying the threshold, and receives a priority SA file, associated with the priority service, via the priority channel.

20 Claims, 9 Drawing Sheets

(51) Int. Cl.
  *H04W 74/08* (2009.01)
  *H04W 48/16* (2009.01)
  *H04W 88/18* (2009.01)
  *H04W 88/02* (2009.01)
  *H04W 28/02* (2009.01)
  *H04L 29/08* (2006.01)
  *H04W 84/00* (2009.01)
  *H04L 67/51* (2022.01)
  *H04L 67/12* (2022.01)

(52) U.S. Cl.
  CPC ......... *H04W 74/0875* (2013.01); *H04L 67/12* (2013.01); *H04L 67/16* (2013.01); *H04W 28/0215* (2013.01); *H04W 28/0252* (2013.01); *H04W 84/005* (2013.01); *H04W 88/02* (2013.01); *H04W 88/184* (2013.01)

(56) References Cited

U.S. PATENT DOCUMENTS

| | | | |
|---|---|---|---|
| 9,705,692 B2 | 7/2017 | Kim et al. | |
| 10,070,338 B2* | 9/2018 | Boban | H04W 28/08 |
| 10,389,545 B2 | 8/2019 | Kim et al. | |
| 10,701,526 B2* | 6/2020 | Lisewski | H04W 4/06 |
| 2007/0136759 A1 | 6/2007 | Zhang et al. | |
| 2010/0195558 A1 | 8/2010 | Koskinen | |
| 2012/0173746 A1 | 7/2012 | Salinger et al. | |
| 2014/0233452 A1 | 8/2014 | Kim et al. | |
| 2014/0313965 A1 | 10/2014 | Basra et al. | |
| 2015/0222553 A1 | 8/2015 | Macdonald et al. | |
| 2015/0270979 A1* | 9/2015 | Andrada | H04L 51/38 370/390 |
| 2015/0282210 A1* | 10/2015 | Li | H04W 76/14 455/436 |
| 2016/0255171 A1 | 9/2016 | Salinger et al. | |
| 2017/0171588 A1 | 6/2017 | Phillips et al. | |
| 2017/0208007 A1* | 7/2017 | Malhotra | H04L 47/15 |
| 2017/0324836 A1 | 11/2017 | Lisewski et al. | |
| 2018/0103364 A1 | 4/2018 | Gholmieh et al. | |
| 2018/0220280 A1 | 8/2018 | Baghel | |
| 2018/0359612 A1 | 12/2018 | Buckley et al. | |
| 2019/0149958 A1 | 5/2019 | Zhang et al. | |
| 2019/0357214 A1* | 11/2019 | Kurian | H04W 76/23 |

\* cited by examiner

AUTOMATICALLY CONNECTING TO A MULTICAST PRIORITY SERVICE WITH REDUCED LATENCY

RELATED APPLICATION

This application is a continuation of U.S. patent application Ser. No. 16/113,750, filed Aug. 27, 2018 (now U.S. Pat. No. 10,701,526), which is incorporated herein by reference.

BACKGROUND

Wireless networks allocate base station resources for different services, such as voice services, unicast services, broadcast services, and multicast services. Evolved multimedia broadcast multicast service (eMBMS) (e.g., in a long-term evolution (LTE) multicast network) provides efficient delivery by allowing streaming content (e.g., video-on-demand content, firmware over the air (FOTA) content, and/or the like) to be sent once and received by many end users using a multicast stream.

For LTE multicast services, information about upcoming broadcast schedules exists as a series of metadata fragments aggregated into a single multipart multipurpose Internet mail extension (MIME) file called a service announcement (SA) file. Currently, one universal service announcement file exists for all LTE multicast services, and is generated, transfer encoded, and compressed by a Broadcast Video Provisioning System (BVPS). The service announcement file is broadcast on a perpetual data bearer called the service discovery channel (SDCH). For standard LTE multicast services, a bearer (e.g., a 50 Kbps bearer) is created that pulses a service announcement file approximately every 1.7 seconds.

DETAILED DESCRIPTION OF PREFERRED EMBODIMENTS

The following detailed description of example implementations refers to the accompanying drawings. The same reference numbers in different drawings can identify the same or similar elements.

Current and future applications of LTE multicast (e.g., autonomous driving, real-time vehicle-to-vehicle (V2V) communication, delivery of live video, and/or the like) require extremely low latency communications. The service announcement file delivery mechanism is a function of the service discovery channel throughput and a size of the service announcement file. However, as a quantity of services increases, the size of the service announcement file increases in proportion. Thus, with the same service discovery channel throughput, delivery of the service announcement file suffers degraded delivery time and makes it impossible to accommodate low latency multicast services. Furthermore, the service announcement file includes information about all nationwide broadcasts, which results in a significant amount of data to parse and long processing times. Finally, service announcement file processing strategy is designed for simplicity and network efficiency, and not low latency.

Some implementations described herein provide a user device that automatically connects to a multicast priority service with reduced latency. For example, the user device can connect to a standard channel of a multicast network based on entering a service area of the multicast network, and can receive a service announcement file from the multicast network and via the standard channel. The user device can parse the service announcement file to determine a list of services identified in the service announcement file, and can receive a selection of a priority service from the list of services. The user device can update a priority counter associated with the priority service based on the selection of the priority service, where the priority counter can indicate a quantity of times the priority service is selected during a period of time. The user device can receive, after the period of time, information indicating entry into the service area of the multicast network, and can determine that the priority counter satisfies a threshold based on receiving the information indicating entry into the service area of the multicast network. The user device can automatically connect to a priority channel of the multicast network, associated with the priority service, based on the priority counter satisfying the threshold, and can receive a priority service announcement file, associated with the priority service, from the multicast network and via the priority channel.

FIGS. 1A-1F are diagrams of an example implementation 100 described herein. As shown in FIGS. 1A-1F, user devices can be associated with a multicast network that includes a broadcast video provisioning system (BVPS) and a Broadcast-Multicast Service Center (BMSC) device. In some implementations, each user device can be associated with a subscriber of wireless telecommunications services provided by a network provider. In some implementations, each user device can include middleware that is capable of processing multicast streams. In some implementations, the network provider can utilize the BMSC and the BVPS, among other devices, to provide multicast services.

Figure 1A:
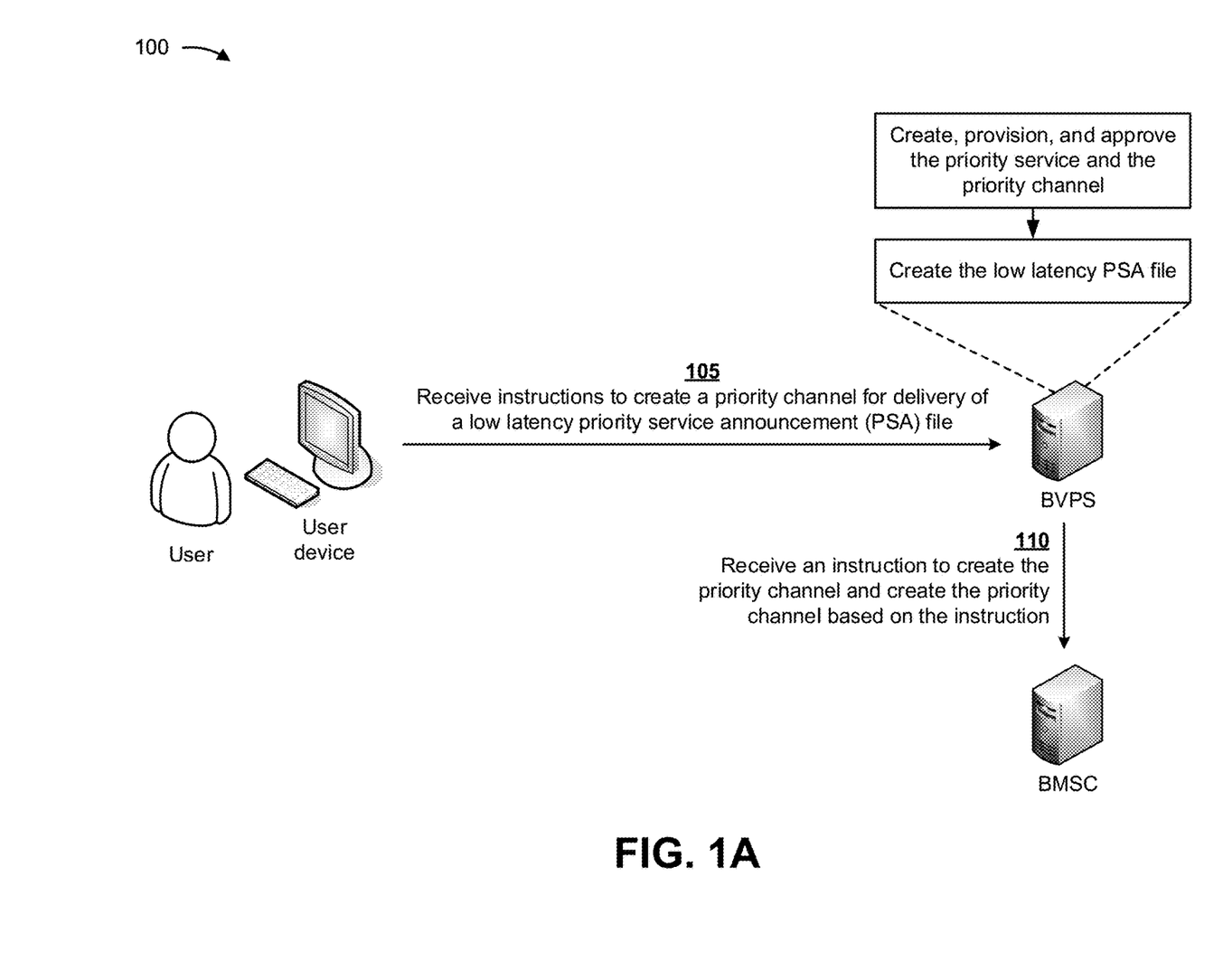
FIGS. 1A-1F are diagrams of an example implementation described herein.

As shown in FIG. 1A, a user of a user device (e.g., a computer, a laptop computer, and/or the like) can provide, to the user device, instructions to create a priority channel for delivery of a low latency priority service announcement (PSA) file. As further shown in FIG. 1A, and by reference number 105, the user can cause the user device to provide, to the BVPS, the instructions to create the priority channel for delivery of the low latency priority service announcement file, and the BVPS can receive the instructions to create the priority channel for delivery of the low latency priority service announcement file. In some implementations, unlike a service announcement file, the priority service announcement file can be limited in scope and can include service information relevant to a single service (e.g., the low latency priority service), a single geographic location, and/or the like. In this way, the priority service announcement file can provide a reduced file size (e.g., due to less metadata as compared to a service announcement file) and can enable expedited parsing of latency critical information.

As further shown in FIG. 1A, the BVPS can create, provision, and/or approve the priority service and/or the priority channel based on the instructions to create the priority channel for delivery of the low latency priority service announcement file. In some implementations, the BVPS can create the low latency priority service announcement file based on the instructions to create the priority channel for delivery of the low latency priority service announcement file.

As further shown in FIG. 1A, and by reference number 110, the BVPS can provide, to the BMSC, an instruction to create the priority channel, and the BMSC can receive the instruction to create the priority channel and can create the priority channel based on the instruction to create the priority channel. In some implementations, the BMSC can create a priority channel for each low latency priority service provided by the multicast network. In some implementations, the priority channel can include a priority service discovery channel (PSDCH) that creates (e.g., for priority LTE multicast services) a bearer that pulses a priority service announcement file approximately every 0.3 seconds (e.g., as compared to 1.7 seconds for the service discovery channel) so that the priority service is received more quickly than a standard service. In some implementations, the BMSC can create the priority channel in a similar manner used to create the service discovery channel (e.g., via a standard multicast broadcast session).

Figure 1B:
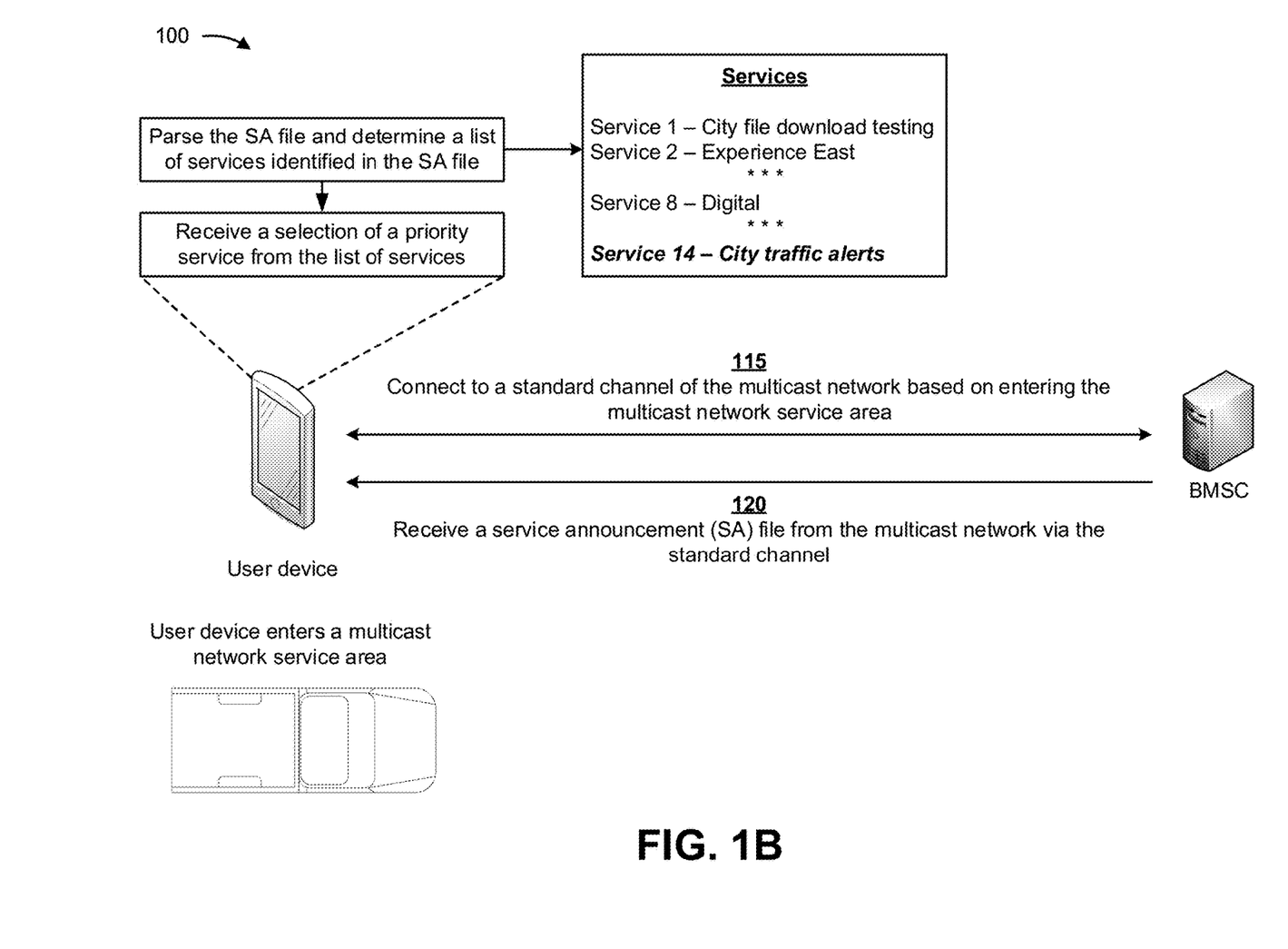

As shown in FIG. 1B, assume that another user device is associated with a vehicle, and that the user device enters a multicast network service area (e.g., via the vehicle). As further shown in FIG. 1B and by reference number 115, the user device can connect to a standard channel (e.g., a service discovery channel) of the multicast network (e.g., via the BMSC) based on entering the multicast service area. In some implementations, the user device can automatically connect to the standard channel when the user device enters the multicast network service area and communicates with the BMSC.

As further shown in FIG. 1B, and by reference number 120, the user device can receive a service announcement file from the multicast network (e.g., the BMSC) via the standard channel. In some implementations, the service announcement file can include a list of services available from the multicast network. As further shown in FIG. 1B, the user device can parse the service announcement file and determine the list of services identified in the service announcement file. For example, the list of services can include standard services (e.g., Service 1—City file download testing, Service 2—Experience East, and Service 8—Digital) and priority services (e.g., Service 14—City traffic alerts). A user of the user device can select (e.g., tune to) a priority service (e.g., Service 14—City traffic alerts) from the list of services, and the user device can receive a selection of the priority service from the list of services.

Figure 1C:
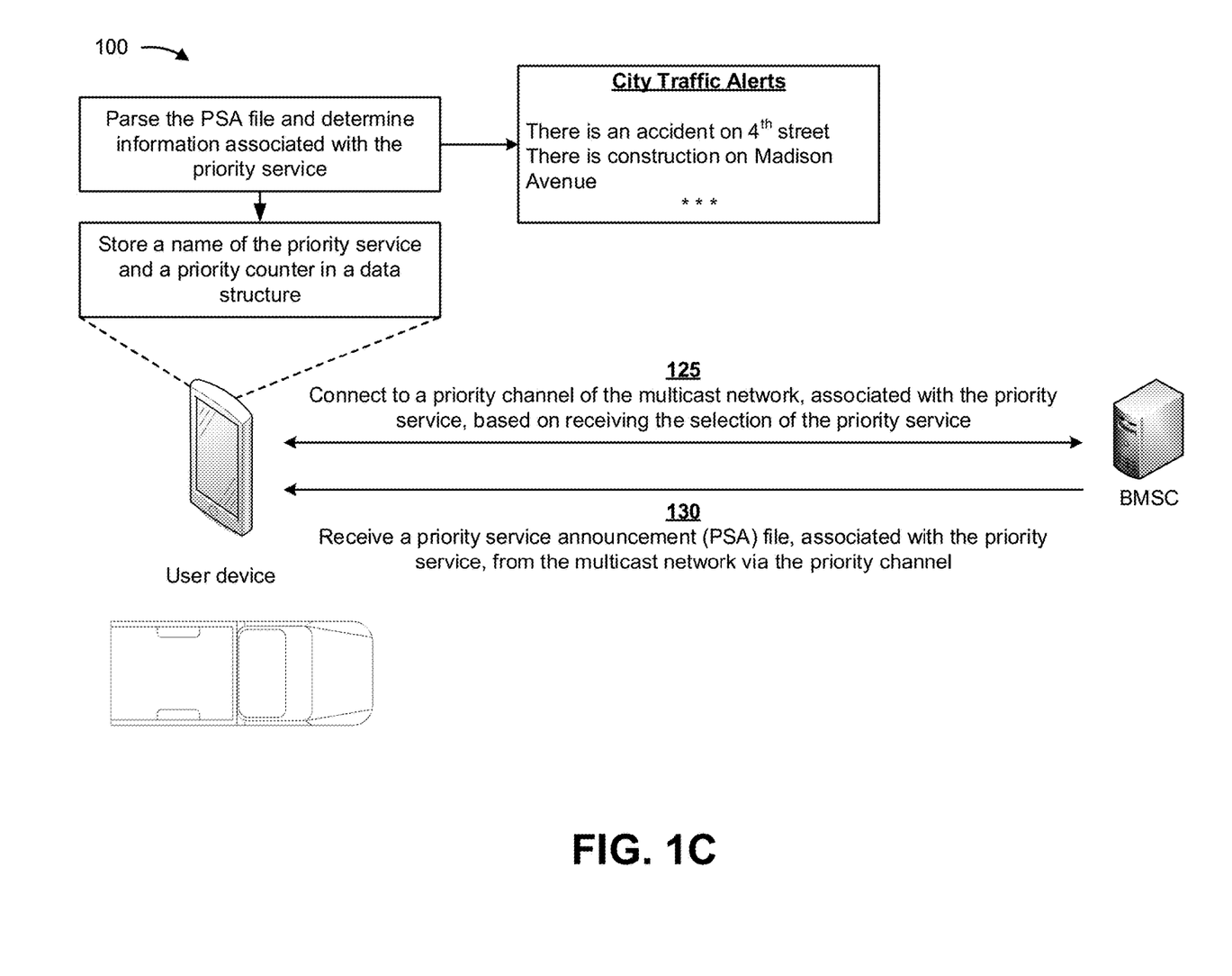

As shown in FIG. 1C, and by reference number 125, the user device can connect to a priority channel (e.g., a priority service discovery channel) of the multicast network (e.g., via the BMSC), associated with the selected priority service, based on receiving the selection of the priority service. In some implementations, the priority channel can include the features described above in connection with FIG. 1A. As further shown in FIG. 1C, and by reference number 130, the user device can receive a priority service announcement file, associated with the priority service, from the multicast network (e.g., the BMSC) via the priority channel.

In some implementations, the priority service announcement file can include information associated with the priority service. As further shown in FIG. 1B, the user device can parse the priority service announcement file and determine the information associated with the priority service in the priority service announcement file. For example, the information associated with the priority service can include information indicating city traffic alerts (e.g., there is an accident on 4th street, there is construction on Madison Avenue, and/or the like). As further shown, the user device can store a name of the priority service and a priority counter in a data structure (e.g., a database, a table, a list, and/or the like) associated with the user device. In some implementations, the priority counter can indicate a quantity of times that the priority service is selected during a predetermined period of time, and can be updated (e.g., increased by one) every time the priority service is selected.

Figure 1D:
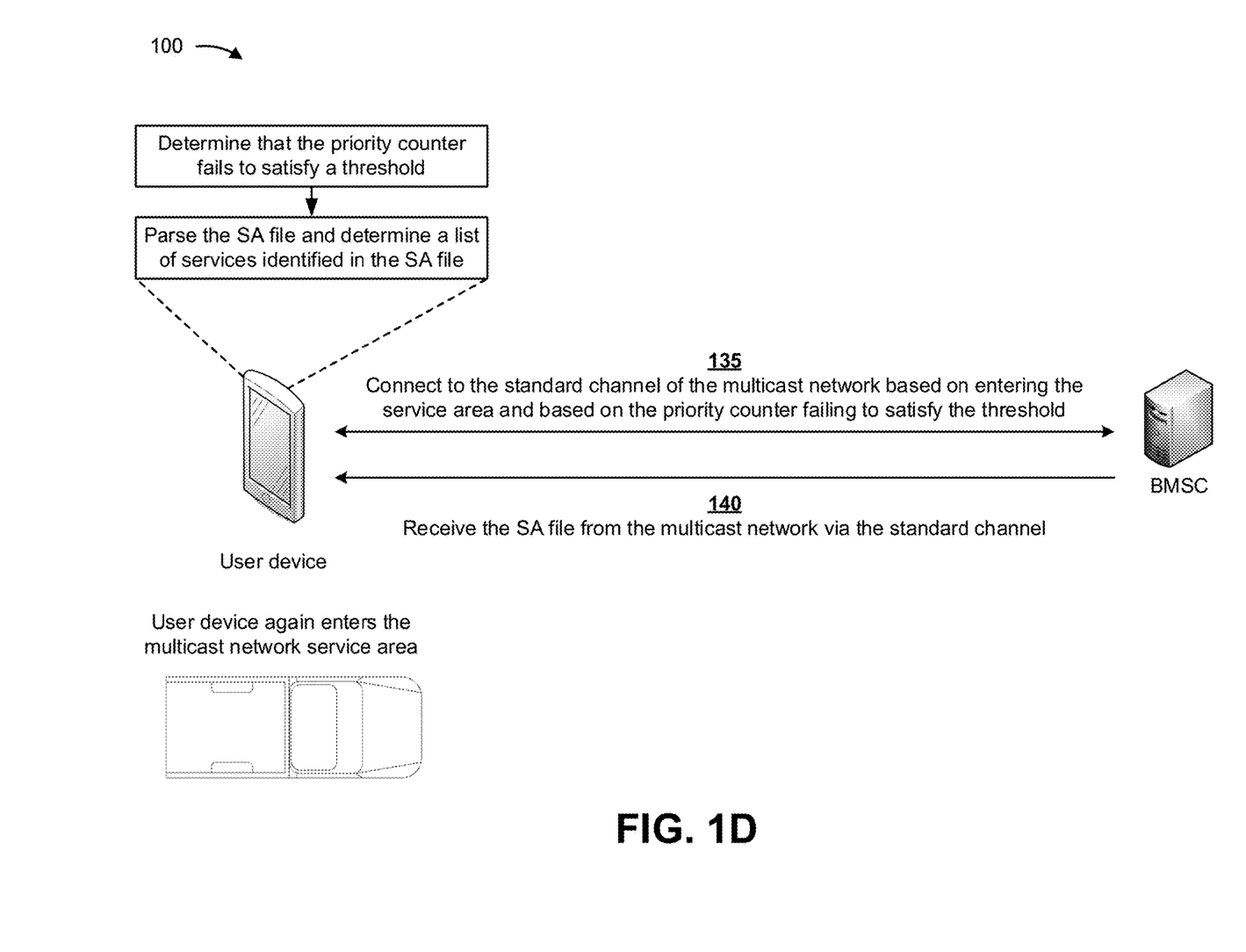

As shown in FIG. 1D, assume that the user device again enters the multicast network service area (e.g., via the vehicle). As further shown in FIG. 1D, before connecting to the multicast network, the user device can determine that the priority counter fails to satisfy a threshold quantity (e.g., of selections of the priority service). In some implementations, the user device can utilize a tuning mechanism to update the priority counter and to determine whether the priority counter satisfies the threshold quantity (e.g., a configurable numeric value, such as three, four, five, and/or the like). For example, the tuning mechanism can utilize the following logic:

```
For t₀ to tᵢ do
    If [application] parses [SDCH] AND tunes to [service name] {
        Then store [service name] and [time/date] as new entry in
        [database]
        Then count occurrences of [service name]
            If count of occurrences of [service name] in [database] >=
            [threshold] {
                Then in subsequent power cycle skip parsing [SDCH]
                AND tune
                directly to [service name]
                ELSE
                Then tune to [SDCH] as normal }}
    End
``` where $t_0$ can include an initial time of utilizing the tuning mechanism, $t_i$ can be infinity or some end time, service name can include a name of a specific multicast service from the SDCH, database can include a data structure stored on the user device, and threshold can include a configurable numeric value.

As further shown in FIG. 1D, and by reference number 135, since the user device determines that the priority counter fails to satisfy the threshold quantity, the user device can connect to the standard channel (e.g., the service discovery channel) of the multicast network (e.g., via the BMSC) based on again entering the multicast service area. In some implementations, the user device can automatically connect to the standard channel when the user device determines that the priority counter fails to satisfy the threshold quantity, again enters the multicast network service area, and communicates with the BMSC.

As further shown in FIG. 1D, and by reference number 140, the user device can receive the service announcement file from the multicast network (e.g., the BMSC) via the standard channel. In some implementations, the service announcement file can include the list of services available from the multicast network and described above in connection with FIG. 1B. As further shown in FIG. 1D, the user device can parse the service announcement file and determine the list of services identified in the service announcement file (e.g., Service 1—City file download testing, Service 2—Experience East, Service 8—Digital, and Service 14—City traffic alerts), as described above.

Figure 1E:
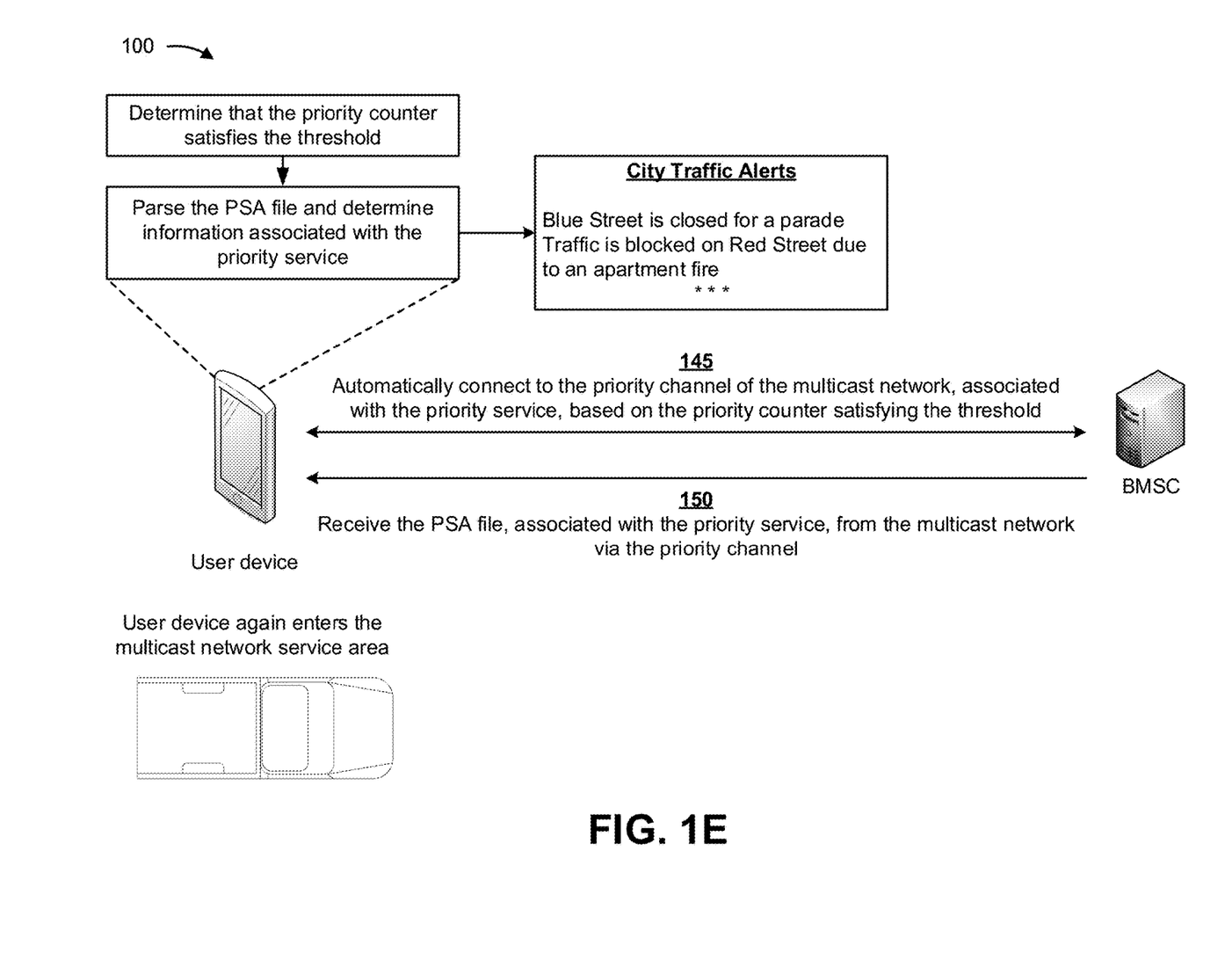

As shown in FIG. 1E, assume that the user device again enters the multicast network service area (e.g., via the vehicle). As further shown in FIG. 1E, before connecting to the multicast network, the user device can determine that the priority counter satisfies the threshold quantity (e.g., of selections of the priority service). In some implementations, the user device can utilize the tuning mechanism to update the priority counter and to determine that the priority counter satisfies the threshold quantity.

As further shown in FIG. 1E, and by reference number 145, since the user device determines that the priority counter satisfies the threshold quantity, the user device can automatically connect to the priority channel (e.g., the priority service discovery channel) of the multicast network (e.g., via the BMSC), associated with the priority service, based on the priority counter satisfying the threshold quantity. In such implementations, the user device can avoid the steps associated with connecting to the standard channel, downloading a large service discovery file, and toggling through the services listed in the large service discovery file. In some implementations, the user device can automatically connect to the priority channel when the user device determines that the priority counter satisfies the threshold quantity, again enters the multicast network service area, and communicates with the BMSC.

As further shown in FIG. 1E, and by reference number 150, the user device can receive the priority service announcement file, associated with the priority service, from the multicast network (e.g., the BMSC) via the priority channel. In some implementations, the priority service announcement file can include information associated with the priority service. As further shown in FIG. 1E, the user device can parse the priority service announcement file and determine the information associated with the priority service in the priority service announcement file. For example, the information associated with the priority service can include information indicating city traffic alerts (e.g., Blue Street is closed for a parade, traffic is blocked on Red Street due to an apartment fire, and/or the like).

Figure 1F:
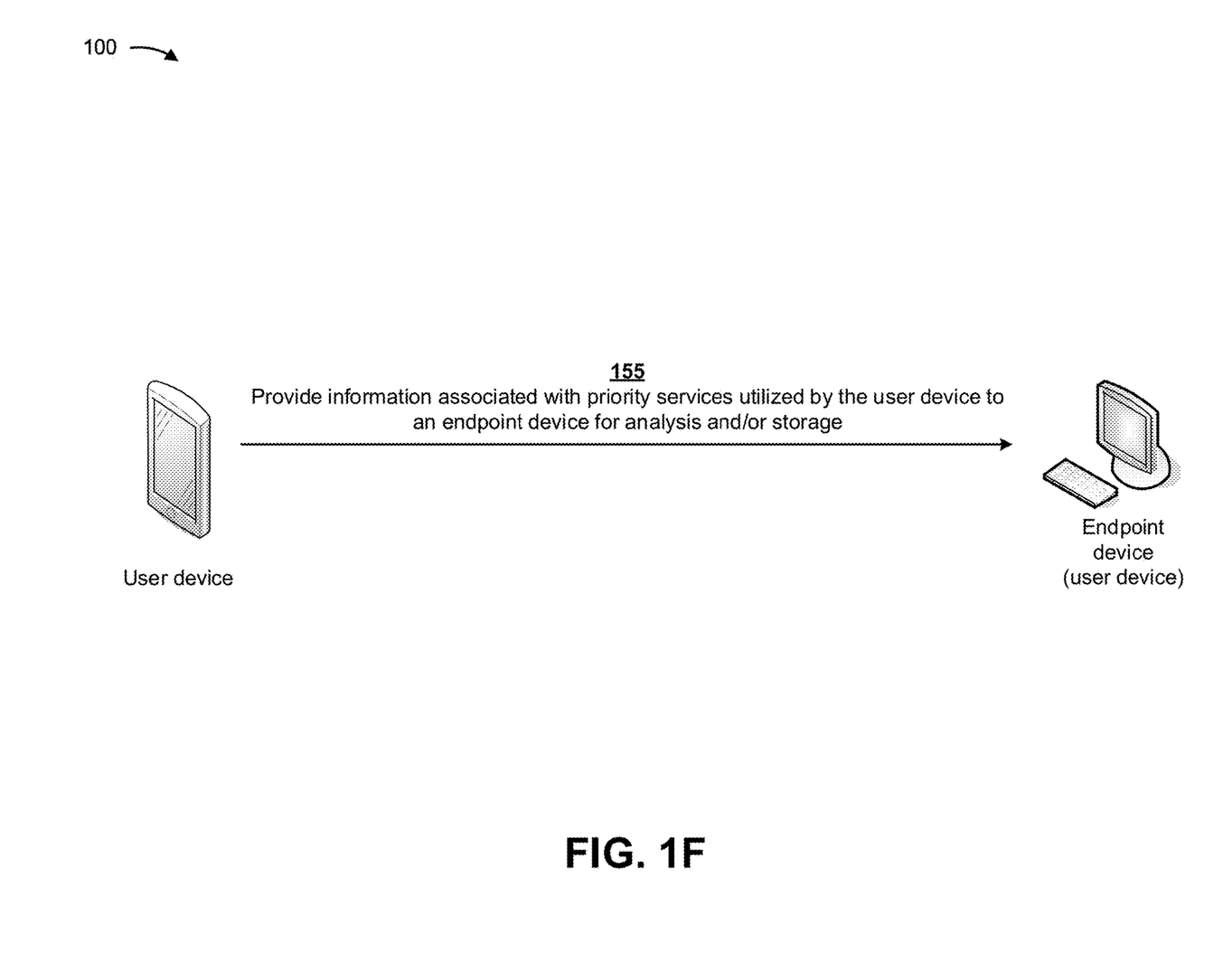

As shown in FIG. 1F, and by reference number 155, the user device can provide information associated with priority services utilized by the user device to an endpoint device (e.g., a user device) for analysis and/or storage. In some implementations, the endpoint device can analyze the information associated with the priority services to determine whether the user device should automatically switch to a priority service associated with a multicast network. For example, if the threshold quantity is set too high in the user device, the user device cannot automatically switch to a priority service. In such implementations, the endpoint device can instruct the user device to reduce the threshold quantity so that the user device automatically switches to the priority service. In some implementations, the endpoint device can receive information associated with priority services utilized by multiple user devices, and can adjust the threshold quantity for one or more of the multiple user devices based on the information.

In this way, the service discovery channel functions like a channel guide for the user device, and a new user of the user device can wait for the channel guide to load and can scroll through several pages to find a desired priority channel. Eventually the new user device learns which channel is of interest (e.g., the priority channel), and bypasses the guide channel entirely, saving time and reducing latency associated with tuning to relevant content. Furthermore, the user device can automatically tune directly to a specific priority service discovery channel of interest, which can save time, user device computing resources (e.g., processing resources, memory resources, and/or the like), and network resources associated with first tuning to the service discovery channel and parsing corresponding service announcement files.

In this way, several different stages of the process for connecting to a multicast priority service with reduced latency are automated, which can remove human subjectivity and waste from the process, and which can improve speed and efficiency of the process and conserve computing resources (e.g., processing resources, memory resources, and/or the like). Furthermore, implementations described herein use a rigorous, computerized process to perform tasks or roles that were not previously performed or were previously performed using subjective human intuition or input. For example, currently there does not exist a technique that automatically connects to a multicast priority service with reduced latency. Finally, automating the process for connecting to a multicast priority service with reduced latency conserves computing resources (e.g., processing resources, memory resources, and/or the like) associated with the user device and that would otherwise be wasted in attempting to connect to a multicast priority service with reduced latency.

As indicated above, FIGS. 1A-1F are provided merely as examples. Other examples are possible and can differ from what was described with regard to FIGS. 1A-1F.

Figure 2:
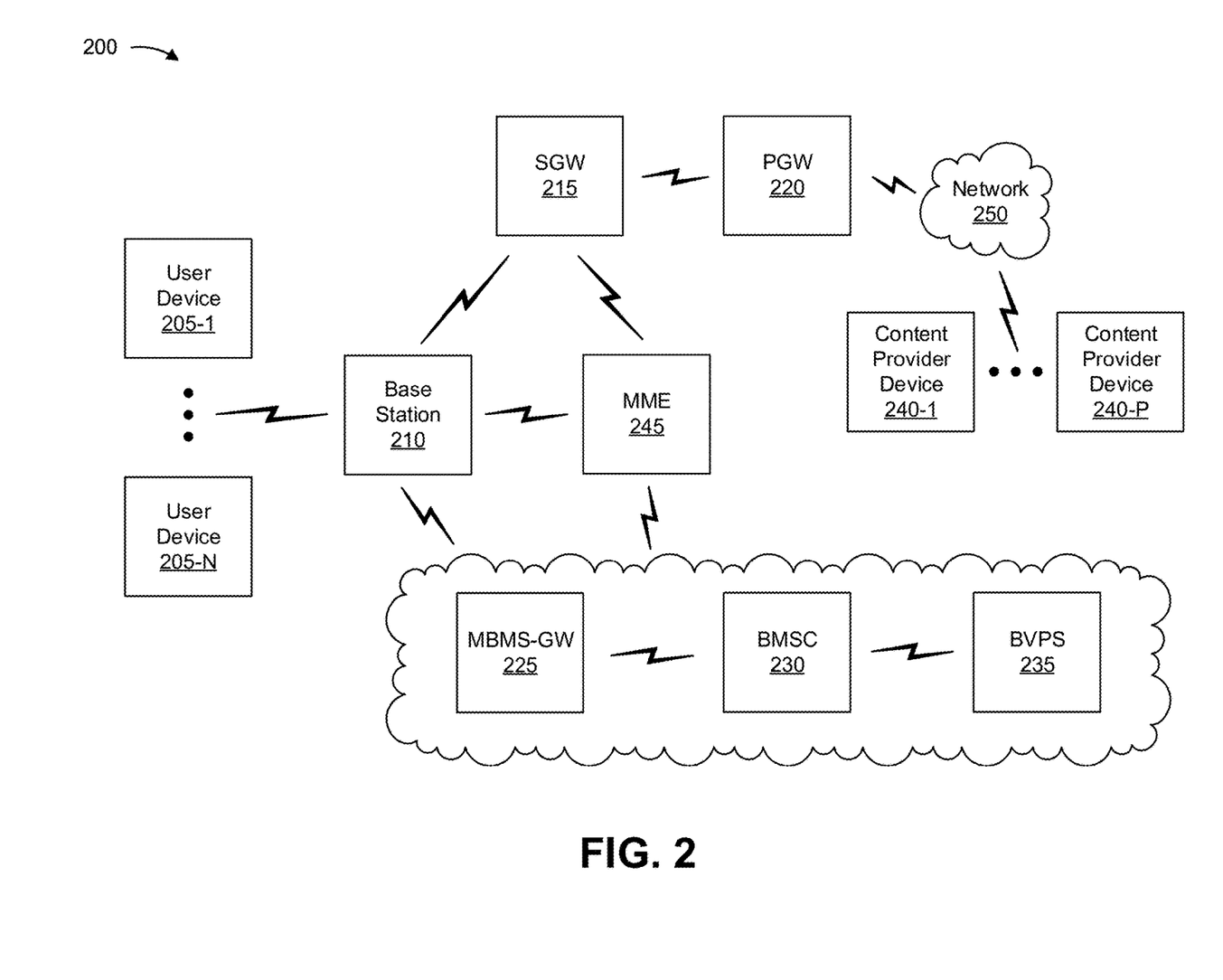
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include one or more user devices 205-1 through 205-N (N≥1) (hereinafter referred to collectively as user devices 205, and individually as user device 205), a base station 210, a serving gateway (SGW) 215, a packet data-network gateway (PGW) 220, a Multimedia Broadcast/Multicast Service Gateway (MBMS-GW) 225, a BMSC 230, a BVPS 235, one or more content provider devices 240-1 through 240-P (P≥1) (hereinafter referred to collectively as content provider devices 240, and individually as content provider device 240), a mobility management entity device (MME) 245, and/or a network 250. Devices of environment 200 can interconnect via wired connections, wireless connections, or a combination of wired and wireless connections.

User device 205 includes one or more devices capable of receiving, generating, storing, processing, and/or providing information, such as information described herein. For example, user device 205 can include a mobile phone (e.g., a smart phone, a radiotelephone, etc.), a laptop computer, a tablet computer, a desktop computer, a handheld computer, a gaming device, an in-vehicle device (e.g., a navigational device, an entertainment device, a communication device, and/or the like), a wearable communication device (e.g., a smart watch, a pair of smart glasses, etc.), or a similar type of device. In some implementations, user device 205 can receive information from and/or transmit information to BMSC 230 and/or BVPS 235 via base station 210.

Base station 210 includes one or more devices capable of receiving, generating, storing, processing, and/or providing information, such as audio, video, text, and/or other traffic, destined for and/or received from user device 205. In some implementations, base station 210 can include an evolved node B (e.g., eNodeB or eNB) associated with a LTE network that receives traffic from and/or sends traffic to network 250 via SGW 215 and/or PGW 220. Additionally, or alternatively, one or more base stations 210 can be associated with a radio access network (RAN) that is not associated with the LTE network. Base station 210 can send traffic to and/or receive traffic from user device 205 via an air interface. In some implementations, base station 210 can include a small cell base station, such as a base station of a microcell, a picocell, and/or a femtocell.

SGW 215 includes one or more devices capable of routing information packets. For example, SGW 215 can include a traffic transfer device, such as a gateway, a router, a modem, a switch, a firewall, a network interface card (NIC), a hub, a bridge, a server device, an optical add/drop multiplexer (OADM), or any other type of device that processes and/or transfers traffic (e.g., packets). In some implementations, SGW 215 can aggregate traffic received from one or more base stations 210 associated with the LTE network, and can send the aggregated traffic to network 250 (e.g., via PGW 220) and/or other network devices associated with an evolved packet core (EPC) and/or an Internet Protocol Multimedia Subsystem (IMS) core. SGW 215 can also receive traffic from network 250 and/or other network devices, and can send the traffic to user device 205 via base station 210. Additionally, or alternatively, SGW 215 can perform operations associated with handing off user device 205 to and/or from a LTE network.

PGW 220 includes one or more devices capable of providing connectivity for user device 205 to external packet data networks. For example, PGW 220 can include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 220 can aggregate traffic received from one or more SGWs 215, and can send the aggregated traffic to network 250. Additionally, or alternatively, PGW 220 can receive traffic from network 250, and can send the traffic to user device 205 via SGW 215 and base station 210. PGW 220 can record data usage information (e.g., byte usage).

MBMS-GW 225 includes one or more devices capable of routing packets related to a multicast stream or a broadcast stream. For example, MBMS-GW 225 can include a traffic transfer device, such as a gateway, a router, a modem, a switch, a firewall, a NIC, a hub, a bridge, a server device, an OADM, or any other type of device that processes and/or transfers traffic. MBMS-GW 225 can receive traffic from network 250 and/or other network devices, and can send the received traffic (e.g., streaming content) to user device 205 via base station 210.

BMSC 230 includes one or more devices capable of receiving, generating, storing, processing, and/or providing information associated with providing a broadcast or multicast service. For example, BMSC 230 can include a server device, a traffic transfer device (e.g., a router, a switch, a hub, etc.), or a similar device. In some implementations, BMSC 230 can allocate bandwidth for providing a broadcast or a multicast service, and/or can instruct other devices associated with providing the broadcast or multicast service.

BVPS 235 includes one or more devices capable of receiving, generating, storing, processing, and/or providing information associated with providing a broadcast or multicast service. For example, BVPS 235 can include a server device, a traffic transfer device (e.g., a router, a switch, a hub, etc.), or a similar device. In some implementations, BVPS 235 can provision an eMBMS by communicating with BMSC 230. BVPS 235 can create broadcast and/or multicast services.

Content provider device 240 includes one or more devices capable of receiving, generating, storing, processing, and/or providing streaming content, one or more standard multicast services, one or more priority multicast services, and/or the like. For example, content provider device 240 can include a computing device, such as a server device (e.g., a web server, a proxy server, etc.), a network device, or a similar device.

MME 245 includes one or more devices, such as one or more server devices, capable of managing authentication, activation, deactivation, and/or mobility functions associated with user device 205. In some implementations, MME 245 can perform operations relating to authentication of user device 205. Additionally, or alternatively, MME 245 can facilitate the selection of a particular SGW 215 and/or a particular PGW 220 to serve traffic to and/or from user device 205. MME 245 can perform operations associated with handing off user device 205 from a first base station 210 to a second base station 210 when user device 205 is transitioning from a first cell associated with the first base station 210 to a second cell associated with the second base station 210. Additionally, or alternatively, MME 245 can select another MME (not pictured), to which user device 205 should be handed off (e.g., when user device 205 moves out of range of MME 245).

Network 250 includes one or more wired and/or wireless networks. For example, network 250 can include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
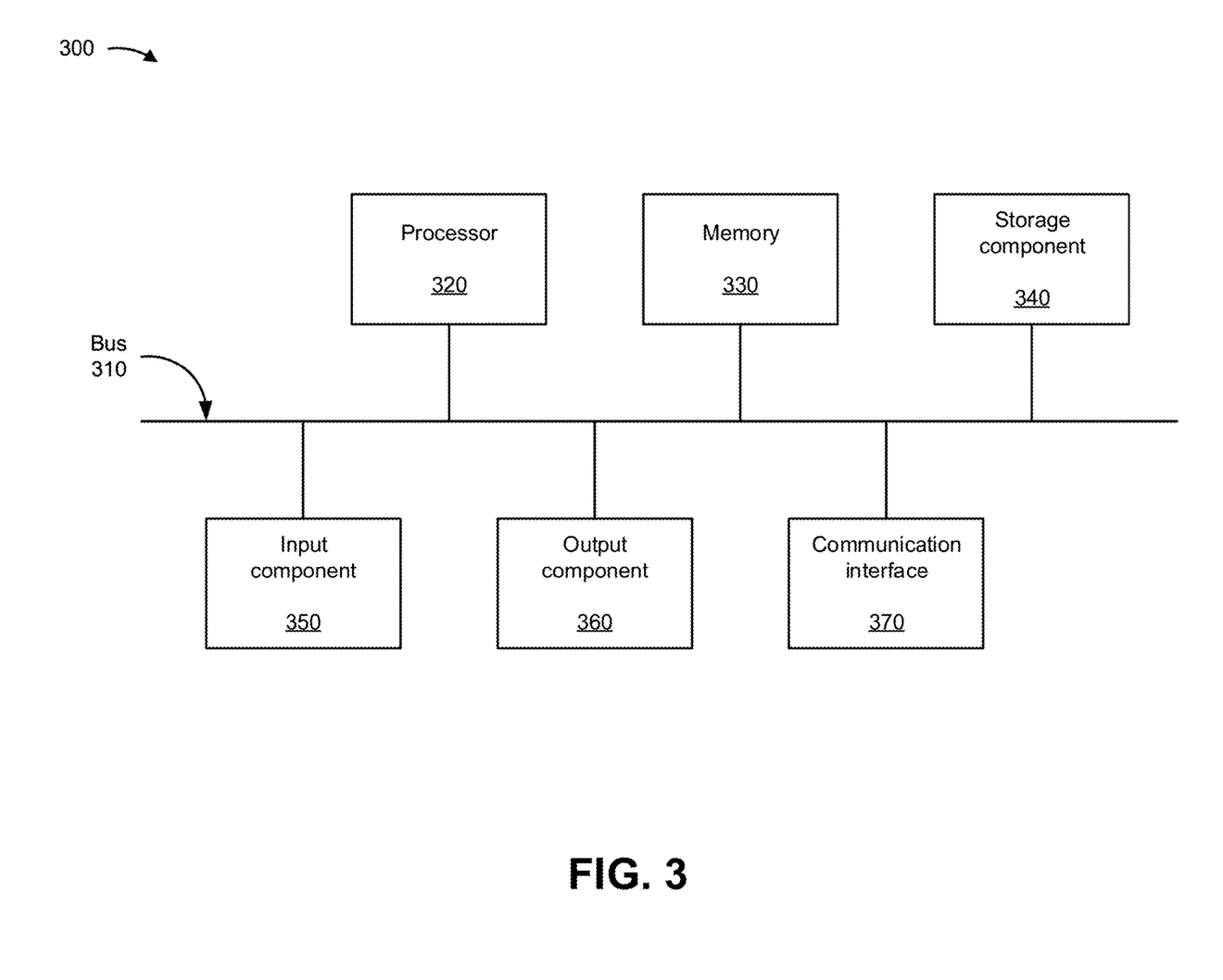
FIG. 3 is a diagram of example components of one or more devices of FIG. 2.

FIG. 3 is a diagram of example components of a device 300. Device 300 can correspond to user device 205, base station 210, SGW 215, PGW 220, MBMS-GW 225, BMSC 230, BVPS 235, content provider device 240, and/or MME 245. In some implementations, user device 205, base station 210, SGW 215, PGW 220, MBMS-GW 225, BMSC 230, BVPS 235, content provider device 240, and/or MME 245 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, and/or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
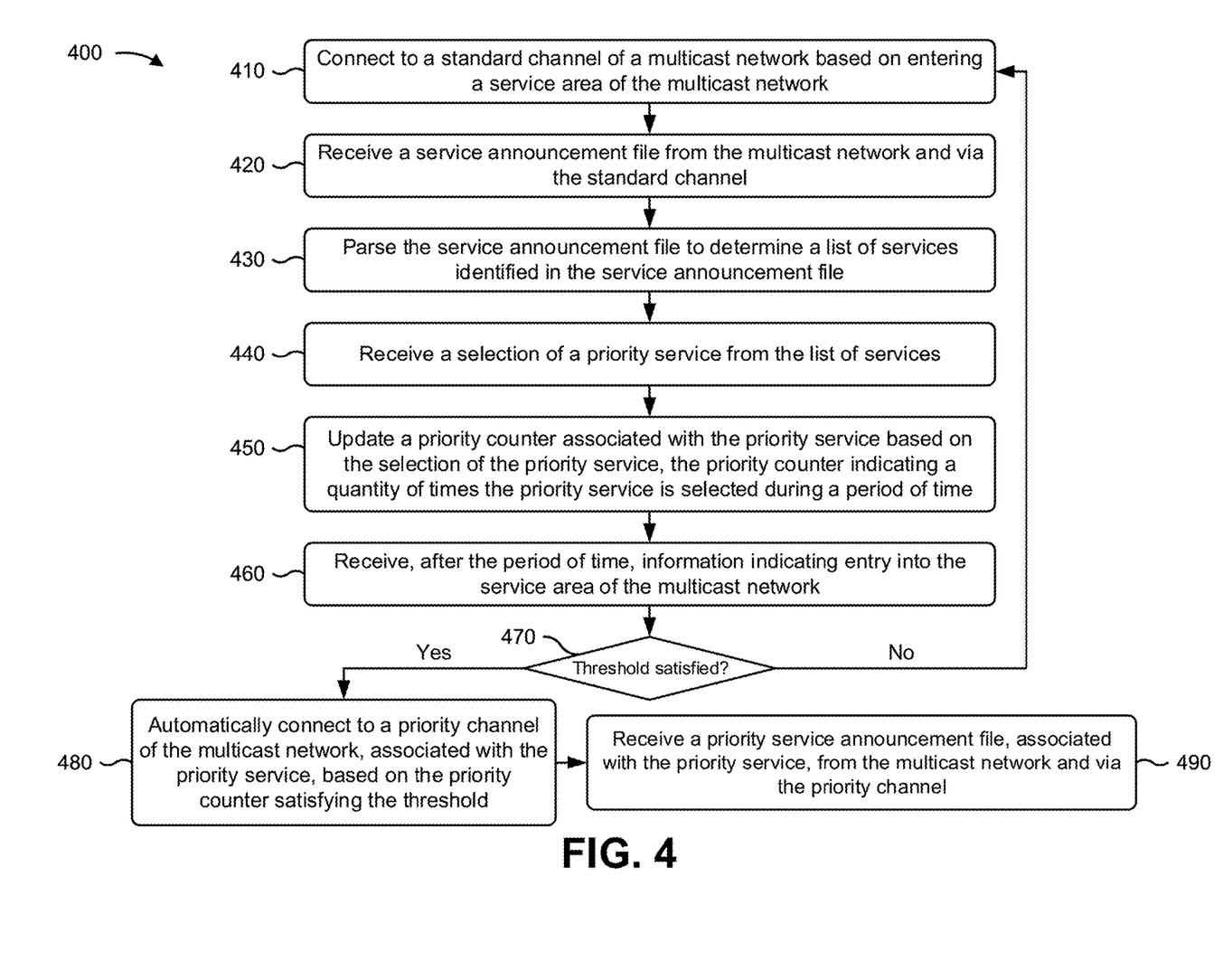
FIG. 4 is a flow chart of an example process for automatically connecting to a multicast priority service with reduced latency.

FIG. 4 is a flow chart of an example process 400 for automatically connecting to a multicast priority service with reduced latency. In some implementations, one or more process blocks of FIG. 4 can be performed by a user device (e.g., user device 205). In some implementations, one or more process blocks of FIG. 4 can be performed by another device or a group of devices separate from or including the user device, such as a BMSC (e.g., BMSC 230) and/or a BVPS (e.g., BVPS 235).

As shown in FIG. 4, process 400 can include connecting to a standard channel of a multicast network based on entering a service area of the multicast network (block 410). For example, a first user device (e.g., using processor 320, communication interface 370, and/or the like) can connect to a standard channel of a multicast network based on entering a service area of the multicast network, as described above in connection with FIGS. 1A-2.

As further shown in FIG. 4, process 400 can include receiving a service announcement file from the multicast network and via the standard channel (block 420). For example, the user device (e.g., using processor 320, communication interface 370, and/or the like) can receive a service announcement file from the multicast network and via the standard channel, as described above in connection with FIGS. 1A-2.

As further shown in FIG. 4, process 400 can include parsing the service announcement file to determine a list of services identified in the service announcement file (block 430). For example, the user device (e.g., using processor 320, memory 330, and/or the like) can parse the service announcement file to determine a list of services identified in the service announcement file, as described above in connection with FIGS. 1A-2.

As further shown in FIG. 4, process 400 can include receiving a selection of a priority service from the list of services (block 440). For example, the user device (e.g., using processor 320, communication interface 370, and/or the like) can receive a selection of a priority service from the list of services, as described above in connection with FIGS. 1A-2.

As further shown in FIG. 4, process 400 can include updating a priority counter associated with the priority service based on the selection of the priority service, the priority counter indicating a quantity of times the priority service is selected during a period of time (block 450). For example, the user device (e.g., using processor 320, storage component 340, and/or the like) can update a priority counter associated with the priority service based on the selection of the priority service, as described above in connection with FIGS. 1A-2. In some implementations, the priority counter can include a quantity of times the priority service is selected during a period of time.

As further shown in FIG. 4, process 400 can include receiving, after the period of time, information indicating entry into the service area of the multicast network (block 460). For example, the user device (e.g., using processor 320, memory 330, communication interface 370, and/or the like) can receive, after the period of time, information indicating entry into the service area of the multicast network, as described above in connection with FIGS. 1A-2.

As further shown in FIG. 4, process 400 can include determining that the priority counter satisfies a threshold based on receiving the information indicating entry into the service area of the multicast network (block 470). For example, the user device (e.g., using processor 320, storage component 340, and/or the like) can determine that the priority counter satisfies a threshold based on receiving the information indicating entry into the service area of the multicast network, as described above in connection with FIGS. 1A-2.

As further shown in FIG. 4, process 400 can include automatically connecting to a priority channel of the multicast network, associated with the priority service, based on the priority counter satisfying the threshold (block 480). For example, the user device (e.g., using processor 320, memory 330, communication interface 370, and/or the like) can automatically connect to a priority channel of the multicast network, associated with the priority service, based on the priority counter satisfying the threshold, as described above in connection with FIGS. 1A-2.

As further shown in FIG. 4, process 400 can include receiving a priority service announcement file, associated with the priority service, from the multicast network and via the priority channel (block 490). For example, the user device (e.g., using processor 320, storage component 340, communication interface 370, and/or the like) can receive a priority service announcement file, associated with the priority service, from the multicast network and via the priority channel, as described above in connection with FIGS. 1A-2.

Process 400 can include additional implementations, such as any single implementation or any combination of implementations described below and/or described with regard to any other process described herein.

In some implementations, the user device can parse the priority service announcement file to identify information associated with the priority service, and can provide the information associated with the priority service. In some implementations, the standard channel can be a standard service discovery channel (SDCH) that transmits the service announcement file at a first data frequency, and the priority channel can be a priority SDCH that transmits the priority service announcement file at a second data frequency less than the first data frequency. In some implementations, the priority service announcement file can have a smaller file size than the service announcement file.

In some implementations, the user device can store information associated with the priority counter and a name of the priority service. In some implementations, the user device can store information associated with priority services utilized by the user device during the period of time, and/or can provide, to an endpoint device, the information associated with priority services utilized by the user device during the period of time. In some implementations, the priority channel and the priority service announcement file can have been created by a multicast device associated with the multicast network.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A user device, comprising:
one or more memories; and
one or more processors, communicatively coupled to the one or more memories, to:
update a priority counter associated with a priority service,
the priority counter indicating a quantity of times the priority service is selected during a period of time;
receive, after the period of time, information indicating entry into a service area of a multicast network;
determine that the priority counter satisfies a threshold quantity of selections of the priority service based on receiving the information indicating entry into the service area of the multicast network; and
automatically connect to a priority channel of the multicast network, associated with the priority service, based on the priority counter satisfying the threshold quantity of selections of the priority service.

2. The user device of claim 1, wherein the one or more processors are further to:
connect to a standard channel of the multicast network based on entering the service area of the multicast network;

receive a service announcement file from the multicast network and via the standard channel;
parse the service announcement file to determine a list of services identified in the service announcement file; and
receive a selection of the priority service from the list of services; and
wherein the one or more processors, when updating the priority counter, are to:
update the priority counter based on the selection of the priority service.

3. The user device of claim 2, wherein the one or more processors are further to:
receive a priority service announcement file, associated with the priority service, from the multicast network and via the priority channel.

4. The user device of claim 3, wherein:
the standard channel is a standard service discovery channel (SDCH) that transmits the service announcement file at a first data frequency, and
the priority channel is a priority SDCH that transmits the priority service announcement file at a second data frequency less than the first data frequency.

5. The user device of claim 3, wherein the priority service announcement file has a smaller file size than the service announcement file.

6. The user device of claim 3, wherein the one or more processors are further to:
parse the priority service announcement file to identify information associated with the priority service; and
provide the information associated with the priority service.

7. The user device of claim 1, wherein the one or more processors are further to at least one of:
store information associated with priority services utilized by the user device during the period of time; or
provide, to an endpoint device, the information associated with the priority service utilized by the user device during the period of time.

8. A non-transitory computer-readable medium storing instructions, the instructions comprising:
one or more instructions that, when executed by one or more processors of a user device, cause the one or more processors to:
update a priority counter associated with a priority service based on a selection of the priority service, the priority counter indicating a quantity of times the priority service is selected during a period of time;
determine that the priority counter satisfies a threshold quantity of selections of the priority service based on receiving information indicating entry into a service area of a multicast network; and
automatically connect to a priority channel of the multicast network, associated with the priority service, based on the priority counter satisfying the threshold quantity of selections of the priority service.

9. The non-transitory computer-readable medium of claim 8, wherein the instructions further comprise:
one or more instructions that, when executed by the one or more processors, cause the one or more processors to:
receive a priority service announcement file, associated with the priority service, from the multicast network and via the priority channel.

10. The non-transitory computer-readable medium of claim 9, wherein the instructions further comprise:
one or more instructions that, when executed by the one or more processors, cause the one or more processors to:
receive a service announcement file from the multicast network and via a standard channel,
the service announcement file including a list of services, and
the service announcement file being received based on entering into the service area of the multicast network.

11. The non-transitory computer-readable medium of claim 10, wherein:
the standard channel is a standard service discovery channel (SDCH) that transmits the service announcement file at a first data frequency, and
the priority channel is a priority SDCH that transmits the priority service announcement file at a second data frequency less than the first data frequency.

12. The non-transitory computer-readable medium of claim 9, wherein the instructions further comprise:
one or more instructions that, when executed by the one or more processors, cause the one or more processors to:
parse the priority service announcement file to identify information associated with the priority service; and
provide the information associated with the priority service.

13. The non-transitory computer-readable medium of claim 8, wherein the instructions further comprise:
one or more instructions that, when executed by the one or more processors, cause the one or more processors to:
store information associated with the priority counter and a name of the priority service.

14. The non-transitory computer-readable medium of claim 8, wherein the instructions further comprise:
one or more instructions that, when executed by the one or more processors, cause the one or more processors to at least one of:
store information associated with priority services utilized by the user device during the period of time; or
provide, to an endpoint device, the information associated with the priority service utilized by the user device during the period of time.

15. A method, comprising:
updating, by a user device, a priority counter associated with a priority service based on a selection of the priority service,
wherein the selection of the priority service is from a list of services identified in a service announcement file;
determining, by the user device, that the priority counter satisfies a threshold quantity of selections of the priority service based on receiving information indicating entry into a service area of a multicast network;
automatically connecting, by the user device, to a priority channel of the multicast network, associated with the priority service, based on the priority counter satisfying the threshold quantity of selections of the priority service; and
receiving, by the user device, a priority service announcement file, associated with the priority service, from the multicast network and via the priority channel.

16. The method of claim 15, wherein the priority counter indicates a quantity of times the priority service is selected during a period of time.

17. The method of claim 15, wherein the service announcement file is received from the multicast network via a standard channel, and
   wherein the service announcement file is parsed to determine the list of services identified in the service announcement file.

18. The method of claim 17, wherein:
   the standard channel is a standard service discovery channel (SDCH) that transmits the service announcement file at a first data frequency, and
   the priority channel is a priority SDCH that transmits the priority service announcement file at a second data frequency less than the first data frequency.

19. The method of claim 15, wherein the priority service announcement file has a smaller file size than the service announcement file.

20. The method of claim 15, further comprising:
   storing information associated with the priority counter and a name of the priority service.

* * * * *